Oct. 11, 1927.

F. L. ALBEN 1,645,271

CENTERING DEVICE

Filed April 26, 1923

WITNESSES:
JR Ullyers
W.B. Jaspert

INVENTOR
Frank L. Alben
BY
Wesley Clearr
ATTORNEY

Patented Oct. 11, 1927.

1,645,271

UNITED STATES PATENT OFFICE.

FRANK L. ALBEN, OF WILKINSBURG, PENNSYLVANIA, ASSIGNOR TO WESTINGHOUSE ELECTRIC & MANUFACTURING COMPANY, A CORPORATION OF PENNSYLVANIA.

CENTERING DEVICE.

Application filed April 26, 1923. Serial No. 634,882.

My invention relates to railway vehicles, more especially to centering devices employed in connection therewith for maintaining a certain desirable relation between the vehicle body and the driving trucks.

It is among the objects of this invention to provide a centering device for railway vehicles which shall be of simple, compact and durable mechanical construction, which shall be readily adaptable to standard vehicle structures and which shall be capable of maintaining a definite centering relation of the vehicle body relative to the supporting trucks.

In the design of Mallet steam locomotives, electric locomotives and trailing trucks for railway vehicles, some provision is usually embodied for effecting a centering tendency of the body member relative to the trucks. Various forms of complicated centering devices have been proposed, some of which require elaborate mechanical set-ups involving the use of swing links, cam rollers and resilient spring members which are expensive and are limited in their application to the particular design of vehicle in which they are embodied.

My present invention is directed to a centering device for railway vehicles which may be secured by a plurality of mounting brackets to the vehicle body and the transom, or cross-tie, of a driving truck. The device is of simple construction, it may be readily assembled on standard makes of vehicles without necessitating alterations in their design and it is so designed as to efficiently operate to effect centering between the relative members. It also functions to provide stability, particularly lateral stability of the vehicle body and to prevent nosing of the trucks relatively to the body.

Figure 1:
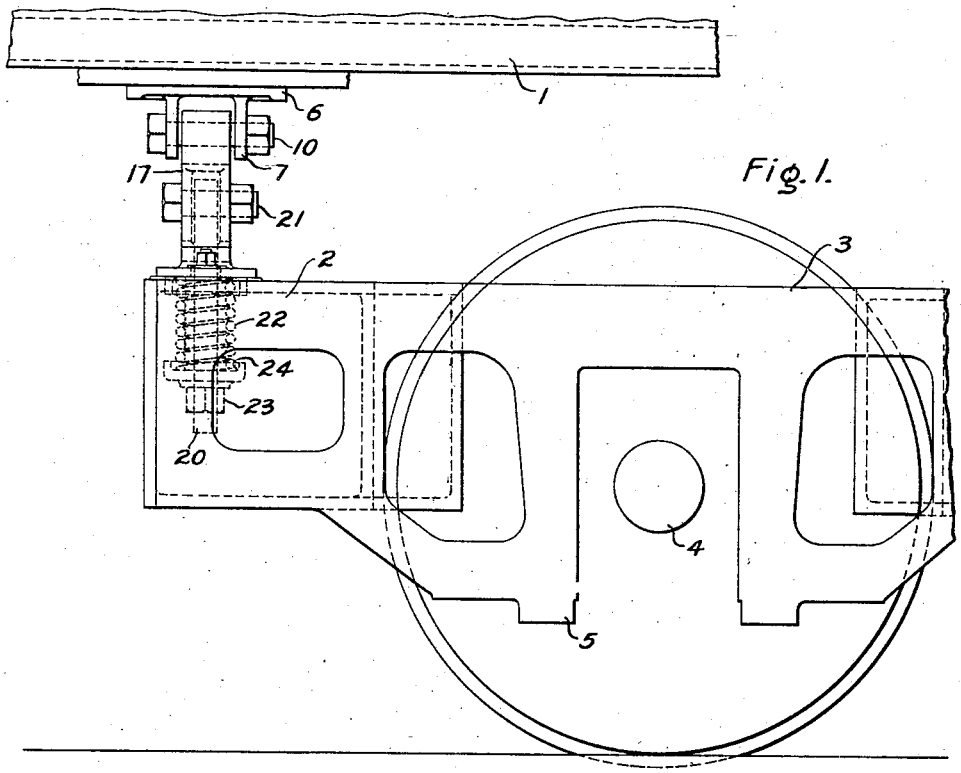
Figure 2:
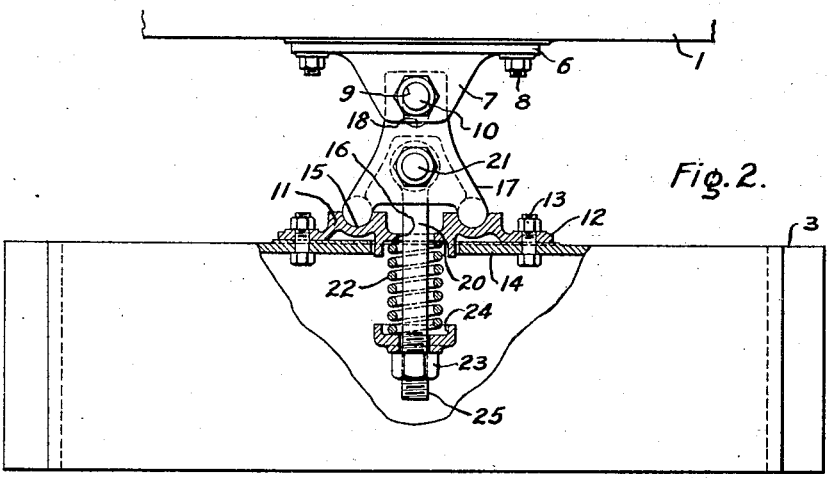

In the accompanying drawing constituting a part hereof and in which like reference characters designate like parts, Figure 1 is a side elevational view of a fragmentary portion of a truck frame and body frame having a centering device connected thereto embodying the principles of my invention, and Fig. 2 is an end elevational view, partially in cross-section, illustrating the details of this device.

The centering device is employed intermediate the sub-frame 1 of a vehicle body, such as a cab (not shown), and the transom 2, or cross-tie, of the truck frame 3, the latter having an axle 4 journaled in the usual manner between the vertical pedestal jaws 5.

A bracket 6 having a plurality of vertically depending extensions 7 is secured to the under side of the vehicle frame 1 by a plurality of bolts 8. The extensions 7 are provided with central openings 9 adapted to receive a hinge bolt 10. A seating bracket 11 provided with a flange 12 having a plurality of openings adapted to receive screw bolts 13 is secured to the truck transom or cross-tie 14 of the frame 3. The bracket 11 is provided with a pair of parallel, symmetrically spaced, concave seating grooves 15 and a central opening 16.

A substantially heart shape cam link 17 having an elongated opening 18 adapted to engage the hinge bolt 10 is mounted in the grooves 15 of the supporting bracket 11, and a tension bolt 20 extending through the opening 16 of the bracket 11 is pivotally mounted by a hinge bolt 21 on the cam link 17. A coil spring 22 is disposed around the bolt 20 and an adjusting nut 23 having a counter-bored seating surface 24 is screwed on the threaded end 25 of the bolt to engage the spring 22.

The operation of this device is briefly as follows: An initial tension is applied to the bolt 20 by compressing the coil spring 22 by adjustment of the nut 23 to provide intially for the smooth operation of the vehicle on tangent tracks and to insure that the necessary spring reaction is available for the proper functioning of the cam link 17. When the vehicle strikes a curve resulting in thrust on the wheel flanges, there is a tendency for nosing of the truck member relatively to the vehicle body which is yieldingly opposed by the function of the cam link 17 which is adapted to pivot in either of the concave seating grooves 15 of the supporting bracket 11, depending on the direction of the curvature of the rails.

The pivotal movement of the link 17 causes longitudinal motion of the tension bolt 20 which compresses the spring 22 thus setting up a force which yieldingly restrains the movement of the link and subsequently reacts upon it to bring it to its normal position. The elongated opening 18 provides the necessary clearance for relative vertical movement of the vehicle body and truck caused by irregularities of the rails, such as joints and the like.

It is evident from the above description of my invention that a centering device made in accordance herewith provides a yielding stabilizing means for preventing excessive nosing of the vehicle trucks and providing in effect a roller bearing for the vehicle body on the truck frames. The relatively small number of parts impart a rugged construction and simplicity of design which adapts my invention generally for use in all types of railway vehicles. This device further provides a direct connection between the body and truck frames which operates as a safety link in the event of derailment.

Although I have described a specific embodiment of my invention, it will be obvious to those skilled in the art that various changes may be made in the details of construction without departing from the principles herein set forth. The cam link may be of any proportions consistent with the amount of rolling action desired on its base support and the mounting brackets may be of any suitable size to withstand the operating stresses to which they are subjected. The concave seating grooves 15 and the convex engaging surface of the link 17 may be reversed so that the link constitutes the female member without altering the function of my device.

I claim as my invention:—

1. A centering device for railway vehicles comprising a cam link having an elongated opening adapted to engage a pivot bolt secured to the sub-frame of the vehicle body, a pair of integral convex legs mounted in concave seats in which they are adapted to respectively pivot, and tension means between said link and seat to yieldingly engage the same.

2. A centering device for railway vehicles comprising a cam link having an elongated opening adapted to engage a pivot bolt secured to the sub-frame of the vehicle body, a pair of integral convex legs mounted in concave seats in which they are adapted to respectively pivot and a spring supported bolt pivotally connected to said link and yieldingly engaging the truck frame.

3. A centering device for railway vehicles comprising a heart-shape cam link adapted to pivotally engage the vehicle body and to seat in a bracket secured to the truck frame, said bracket having concave seating grooves and a spring supported bolt pivotally connected to said link extending therethrough.

4. A centering device for railway vehicles comprising a bracket secured to the underside of the body frame, a heart-shape cam link pivotally mounted in said bracket, a supporting bracket for engaging said link secured to the truck frame, a bolt pivoted to said link and extending vertically through an opening in said supporting bracket and a coil spring for engaging the underside of the supporting bracket disposed around said bolt, said bolt being provided with adjusting means for varying the tension on said spring.

5. A centering device for railway vehicles comprising a heart-shape cam link interposed between the body frame and truck frame, tension means associated therewith to permit yielding engagement of said link and truck frame and means for permitting angular movement of said link about a plurality of pivot seats provided in said truck frame.

In testimony whereof, I have hereunto subscribed my name this 23rd day of April 1923.

FRANK L. ALBEN.